United States Patent [19]

Tokui

[11] Patent Number: 5,493,356
[45] Date of Patent: Feb. 20, 1996

[54] CAMERA CAPABLE OF SELECTING A PICTURE SIZE

[75] Inventor: Masaki Tokui, Kanagawa, Japan

[73] Assignee: Olympus Optical Co., ltd., Tokyo, Japan

[21] Appl. No.: 57,215

[22] Filed: May 4, 1993

Related U.S. Application Data

[63] Continuation-in-part of Ser. No. 981,768, Nov. 25, 1992, abandoned.

[30] Foreign Application Priority Data

Nov. 26, 1991 [JP] Japan .................................. 3-311020
Nov. 26, 1992 [JP] Japan .................................. 4-317417

[51] Int. Cl.$^6$ ............................. G03B 17/02; G03B 9/32
[52] U.S. Cl. ........................................ 354/159; 354/242
[58] Field of Search ............................ 354/94, 159, 241, 354/242, 245, 246

[56] References Cited

U.S. PATENT DOCUMENTS

| | | | |
|---|---|---|---|
| 4,926,202 | 5/1990 | Fukuda et al. | 354/246 |
| 4,952,957 | 8/1990 | Newoto et al. | 354/245 |
| 5,019,847 | 5/1991 | Tanabe | 354/246 |
| 5,086,311 | 2/1992 | Naica et al. | 354/195.1 |
| 5,159,371 | 10/1992 | Fukuda | 354/246 |
| 5,227,824 | 7/1993 | Toshida et al. | 354/195.12 |
| 5,307,111 | 4/1994 | Kurei | 354/402 |
| 5,323,205 | 6/1994 | Matsubara et al. | 354/431 |
| 5,325,140 | 6/1994 | Torikoshi et al. | 354/159 |
| 5,345,285 | 9/1994 | Hushita et al. | 354/159 |
| 5,357,298 | 10/1994 | Imai et al. | 354/159 |

FOREIGN PATENT DOCUMENTS

| | | |
|---|---|---|
| 3-77931 | 4/1991 | Japan . |
| 3-77930 | 4/1991 | Japan . |
| 3-174126 | 7/1991 | Japan . |
| 3-204630 | 9/1991 | Japan . |

*Primary Examiner*—Michael L. Gellner
*Assistant Examiner*—Nicholas J. Tuccillo
*Attorney, Agent, or Firm*—Frishauf, Holtz, Goodman, Langer & Chick

[57] ABSTRACT

This invention provides a shutter unit in which a photographing picture size selecting mechanism is disposed by skillfully utilizing a shutter unit without substantially increasing the size of a camera. The shutter unit includes a shutter plate having a shutter driving section, a cover plate facing the shutter plate, a shutter mechanism provided between the cover and shutter plates and opened/closed by the shutter driving section, picture size regulating members which are made of a plurality of thin plates provided on a surface of the cover plate opposite to a surface thereof facing the shutter plate, and a driving section for the picture size regulating members provided on the shutter plate and/or the cover plate, the driving section for the picture size regulating members being provided above the shutter driving section.

7 Claims, 12 Drawing Sheets

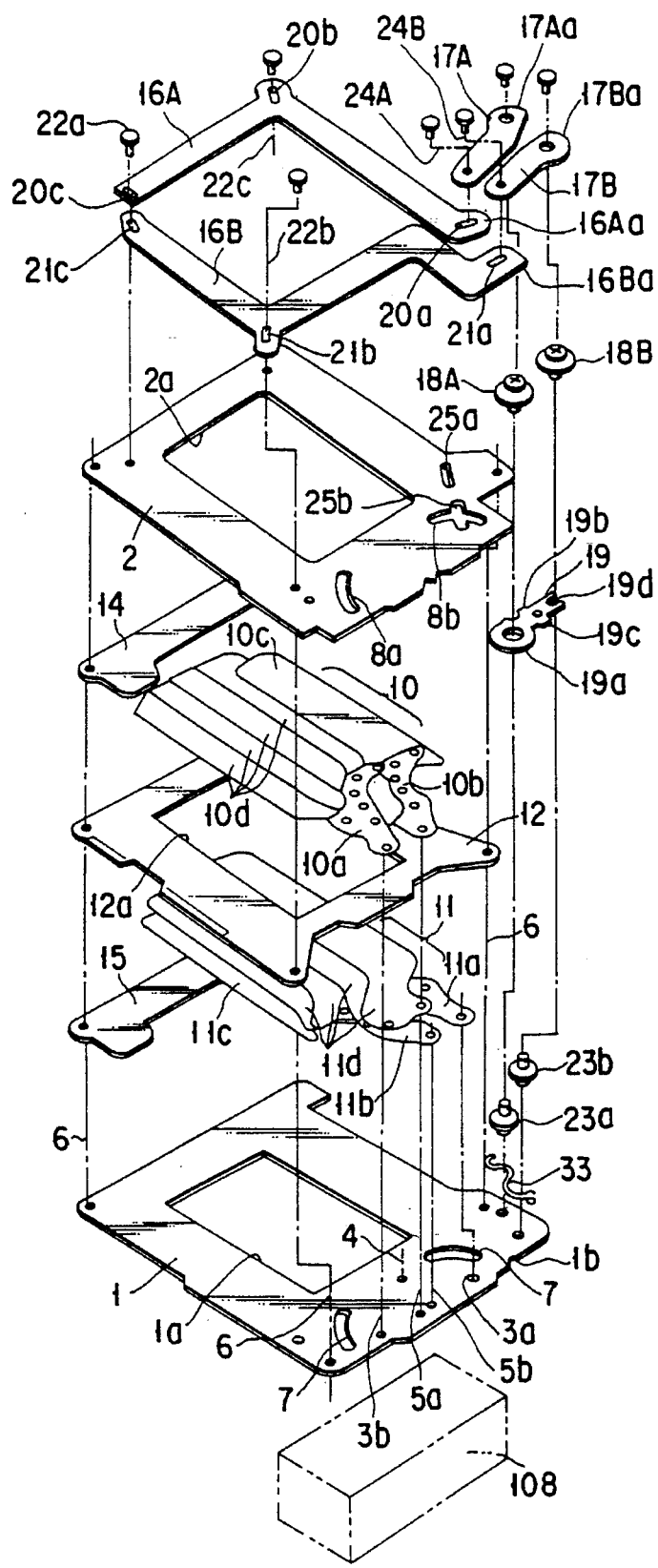
F I G. 1

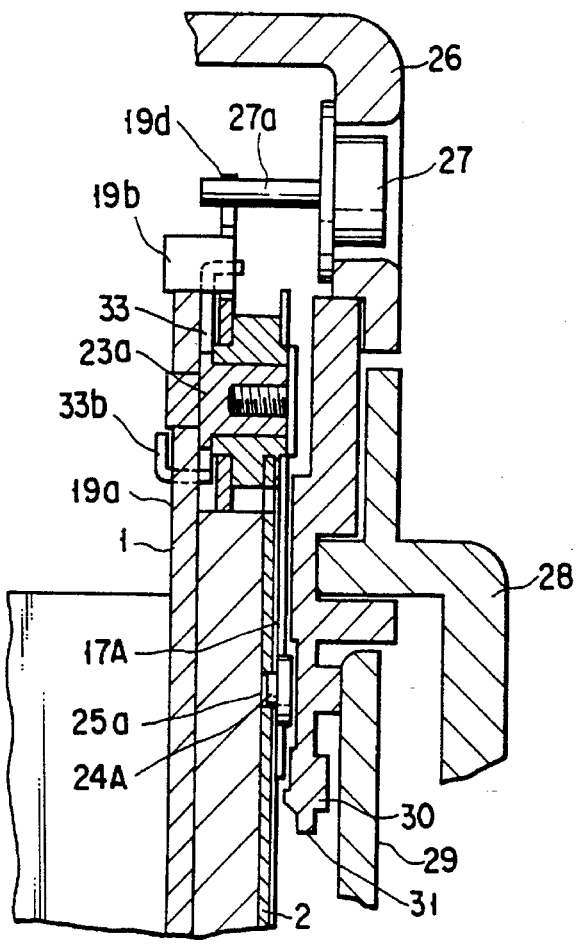
F I G. 5
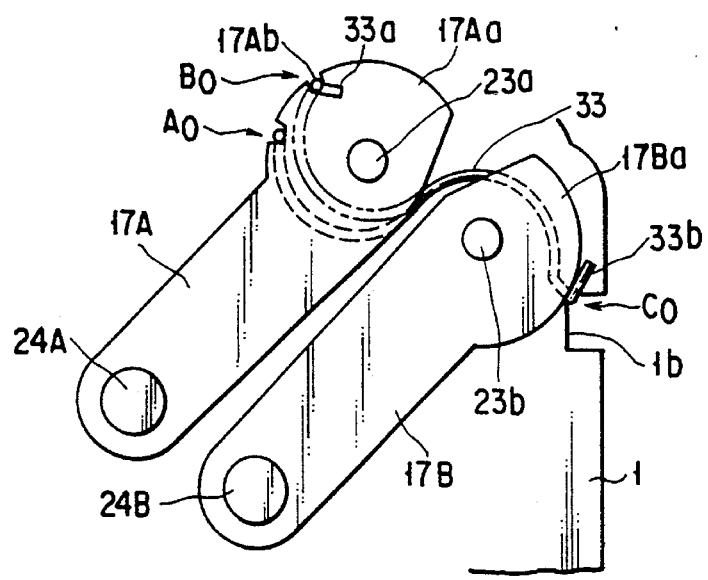
F I G. 6

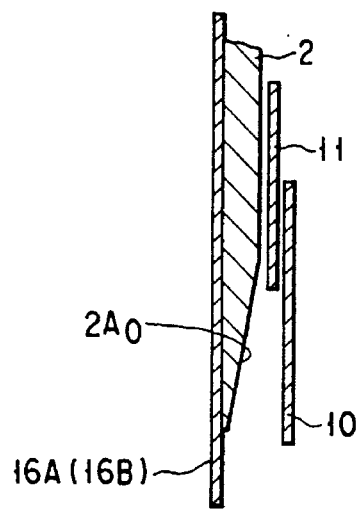
F I G. 1 2
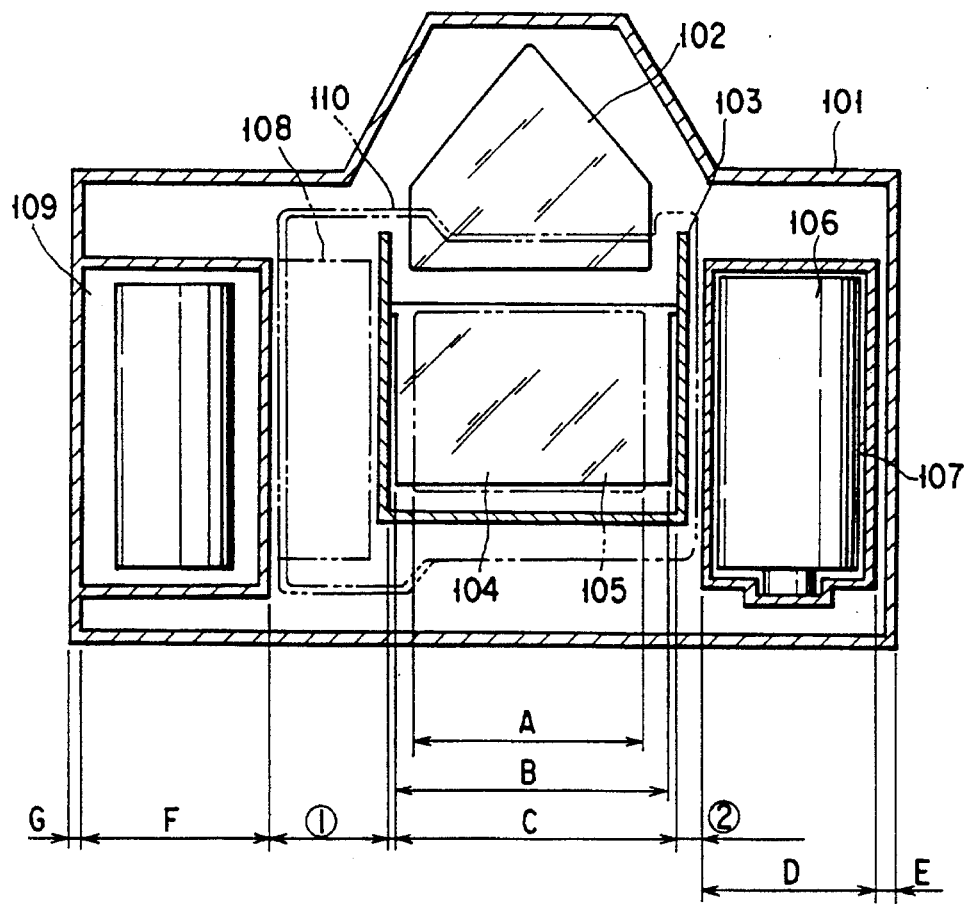
F I G. 1 3 (PRIOR ART)

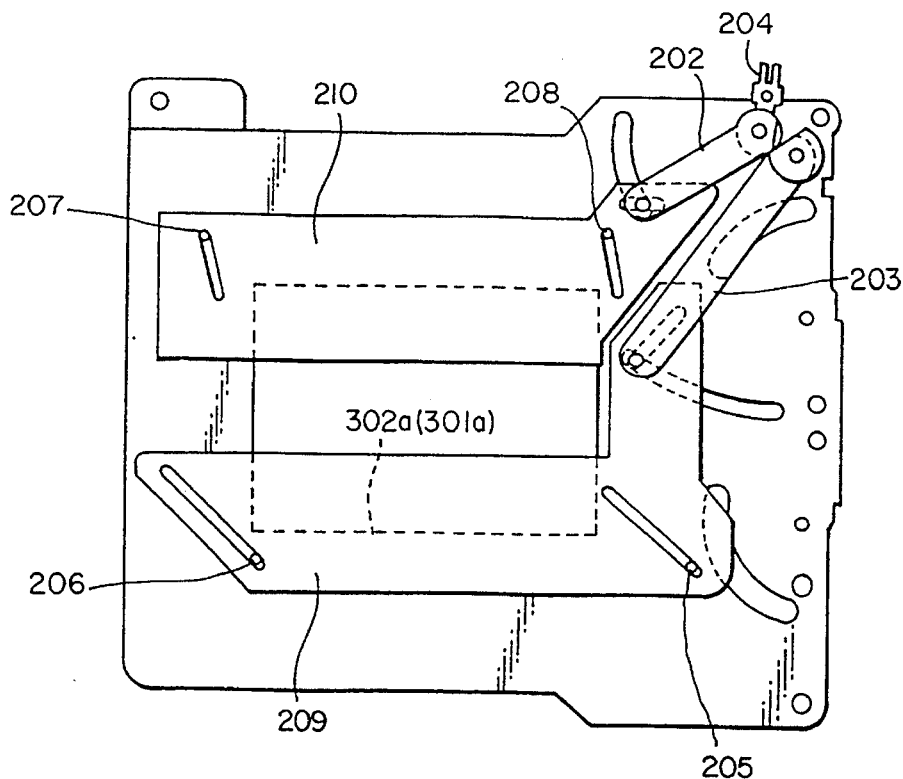
F I G. 17
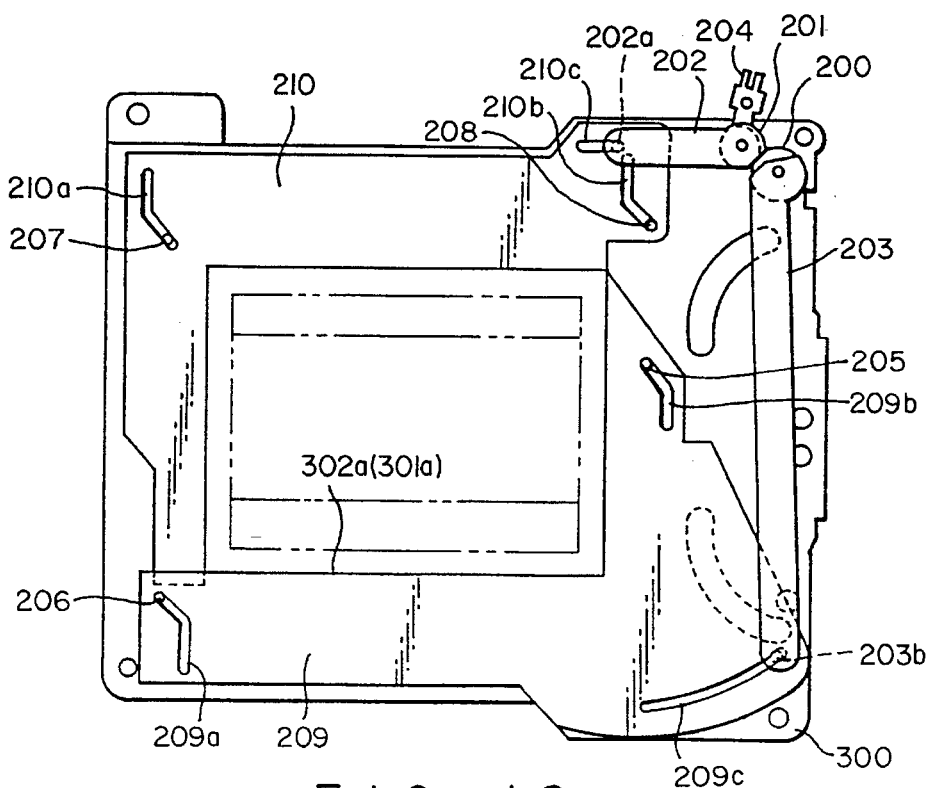
F I G. 18

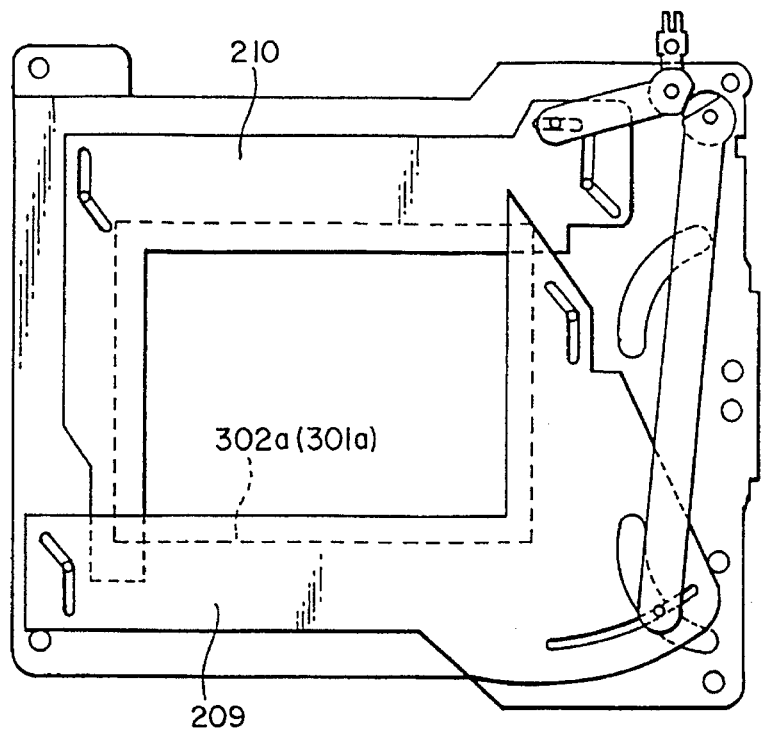
F I G. 19
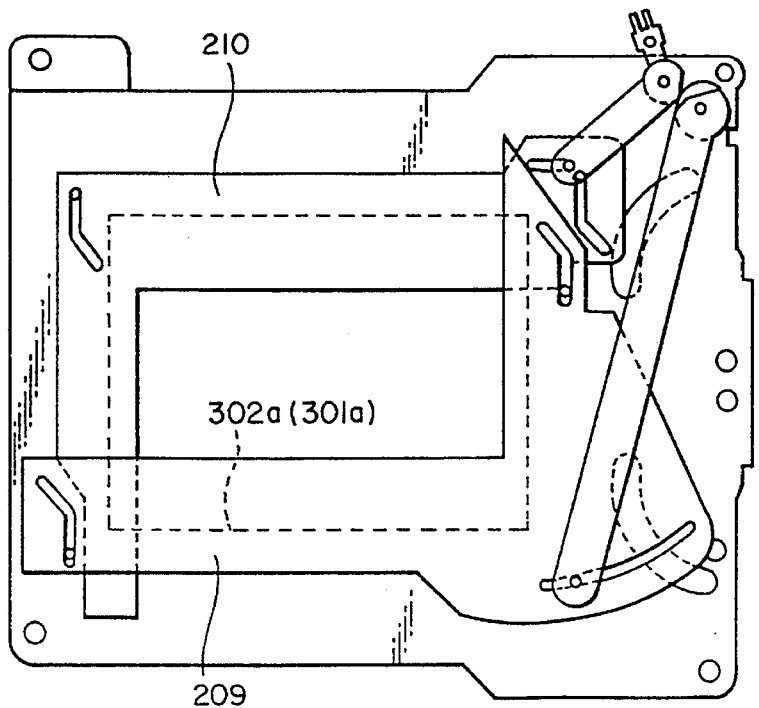
F I G. 20

CAMERA CAPABLE OF SELECTING A PICTURE SIZE

This application is a continuation-in-part of application Ser. No. 07/981,768, filed Nov. 25, 1992 now abandoned.

BACKGROUND OF THE INVENTION

1. Field of the Invention

The present invention relates to a shutter unit and to a camera capable of selecting a picture size and, more particularly, to a shutter unit used in a camera which can photograph in an ordinary picture size and in a picture size larger than that.

2. Description of the Related Art

As is well known, a camera capable of selecting a photographing picture size has already been proposed in, e.g., Published Examined Japanese Utility Model Application No. 44-8047 and Published Unexamined Japanese Patent Application Nos. 3-77930 and 3-77931. A camera of this type can photograph in a full-frame size and a half-frame size or ⅓ size evenly divided in the film feed direction by using a 35-mm width perforated JIS 135 model roll film.

The assignee of the present application also previously proposed a camera (Japanese Patent Application No. 3-205163) which could photograph in an ordinary photographing picture size (24 mm×mm) by using a 35-mm width perforated JIS 135 model roll film and in a photographing picture size larger than this size, e.g., in a picture size of 29 mm×41 mm, by using a 35-mm width non-perforated roll film which employed the same film cartridge as that of this perforated film.

In a camera capable of selecting a photographing picture size as described above, a photographing picture size selecting mechanism is required. When this mechanism is incorporated in the camera, the size of the camera is increased. Such an increase in size is not preferable since it is against the trend of size reduction.

Especially, when a photographing picture size selecting mechanism is to be incorporated in a single-lens reflex camera without changing the appearance of the camera, the space in the camera poses a problem. More specifically, a single-lens reflex camera has an arrangement as follows, as shown in FIG. 13, when its camera body 101 is seen from its front side. A pentaprism 102 is disposed in the upper central portion of the camera body 101. A mirror box 103, having a movable mirror 104 in it and a picture mask frame (aperture) 105 in its deep portion, is disposed below the pentaprism 102. A film supply chamber 107 for receiving a film cartridge 106 therein is disposed on the right side of the mirror box 103, and a shutter driving section 108 is disposed on the left side of the mirror box 103. A film winding chamber 109 having a film winding spool shaft is disposed on the left side of the shutter driving section 108. A shutter unit 110 (see FIG. 14), mounted on a shutter plate (to be described later) and having a vertical-run focal-plane shutter mechanism which is driven by the shutter driving section 108, is disposed between the picture mask frame 105 and the mirror box 103.

Accordingly, assuming that the horizontal sizes of the picture mask frame 105, the movable mirror 104, the mirror box 103, the film supply chamber 107, the space in which the opening/closing lock mechanism of the rear cover is to be disposed, the film winding chamber 109, and the outer casing wall are defined as A, B, C, D, E, F, and G, respectively, hardly no spare space exists in the horizontal direction. Although small spare spaces exist in ① a horizontal size of the space in which the shutter driving section 108 is disposed and in ② a space between the mirror box 103 and the film supply chamber 107, neither spaces can house the photographing picture size selecting mechanism.

When an extra space is to be reserved in the front-rear direction of the camera body 101 to dispose the photographing picture size selecting mechanism in it, since the photographing picture size selecting mechanism including picture size regulating members will be disposed immediately in front of the picture mask frame 105 and immediately behind the mirror box 103, the following inconveniences occur. That is, when the photographing picture size selecting mechanism is disposed in this position, the distance between the movable mirror 104 and the film surface in the direction of the optical axis is increased by the size of this mechanism in the front-rear direction. Thus, a screen 111 (see FIG. 14), which is disposed at a position where it is conjugate to the film surface with respect to the movable mirror 104, must also be moved upward. Then, the height of the camera is increased to increase the overall size of the camera, which is not preferable.

SUMMARY OF THE INVENTION

The present invention has been made to solve the problems described above, and has as its object to provide a shutter unit which is skillfully utilized to dispose a photographing picture size electing mechanism therein without substantially increasing the size of the camera on the basis of findings on the structure of the shutter unit.

According to the present invention, there is provided a shutter unit including a shutter plate having a shutter driving section, a cover plate facing the shutter plate, and a shutter mechanism provided between the cover and shutter plates and opened/closed by the shutter driving section, the shutter unit comprising:

picture size regulating members which are made of a plurality of thin plates provided on a surface of the cover plate opposite to a surface thereof facing the shutter plate; and a driving section for the picture size regulating members provided on the shutter plate and/or the cover plate, the driving section for the picture size regulating members being provided above the shutter driving section.

The driving section of the picture size regulating members is operated to move the picture size regulating members outward, thereby exposing large-picture mask frames (apertures) formed in the shutter and cover plates to set a large photographing picture size. The driving section of the picture size regulating members is operated to move the picture size regulating members inward the large-picture mask frames, thereby setting an ordinary photographing picture size.

BRIEF DESCRIPTION OF THE DRAWINGS

FIG. 1 is an exploded perspective view showing a shutter unit according to an embodiment of the present invention;

FIG. 5 is a sectional view showing the main part of the driving section of the photographing picture size selecting mechanism;

FIG. 6 is an enlarged front view showing the function of a toggle spring;

FIG. 12 is an enlarged sectional view showing the main part of a cover plate of the shutter unit according to the present invention;

FIG. 13 is a schematic diagram showing the arrangement of the interior of the camera body of a single-lens reflex camera;

FIG. 17 is an enlarged front view showing a state where another small photographing picture size is set in the shutter unit shown in FIG. 15;

FIG. 18 is an enlarged front view showing a state where a large photographing picture size is set in a shutter unit according to a third embodiment of the present invention;

FIG. 19 is an enlarged front view showing a state where an ordinary photographing picture size is set in the shutter unit shown in FIG. 18; and FIG. 20 is an enlarged front view showing a state where a small photographing picture size is set in the shutter unit shown in FIG. 18.

DETAILED DESCRIPTION OF THE PREFERRED EMBODIMENTS

Figure 2:
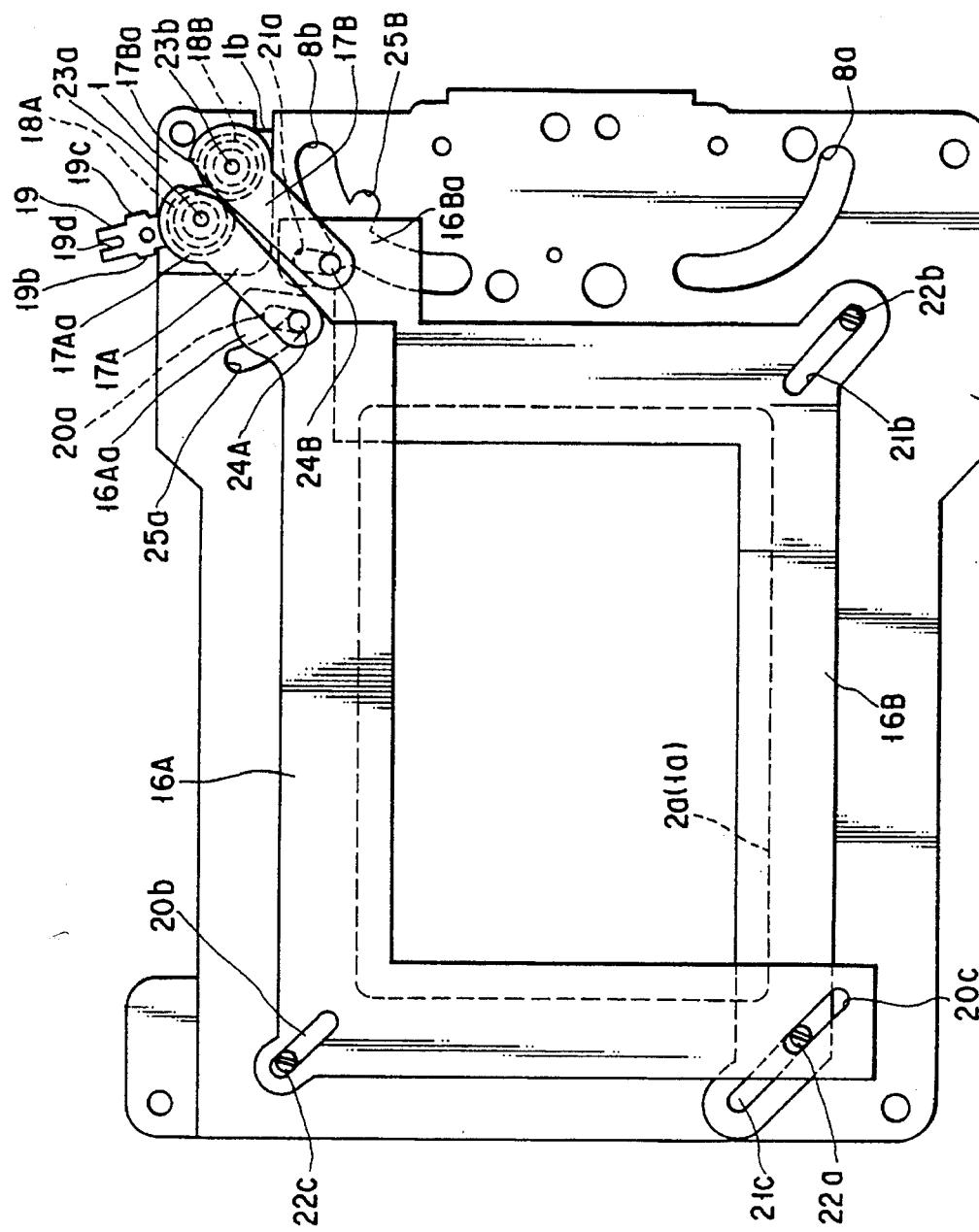
FIG. 2 is an enlarged front view showing a state wherein an ordinary photographing picture size is set in the shutter unit shown in FIG. 1.

The preferred embodiment of the present invention will be described with reference to the accompanying drawings.

FIG. 1 is an exploded perspective view of a shutter unit according to the embodiment of the present invention.

The structure of the shutter unit provided with a photographing picture size selecting mechanism including picture size regulating members will be described. This shutter unit has a shutter mechanism with completely the same structure as that of a conventional vertical-run focal-plane shutter mechanism except that large-picture mask frames (apertures) 1a and 2a are respectively formed in a metal shutter plate 1 and a thin metal cover plate 2.

More specifically, in FIG. 1, the shutter plate 1 disposed on the photographing lens side is located on the lower portion, and the cover plate 2 opposing the shutter plate 1 and disposed on the film surface side is located on the upper portion. Blade driving lever shafts 3a and 3b having distal ends formed with main arm rotating shaft portions, a charge lever shaft 4 serving as a rotational center of charge levers (not shown) for charging the blade driving lever shafts 3a and 3b, auxiliary arm rotating shafts 5a and 5b, and a plurality of shafts 6 for attaching the cover plate 2 on the shutter plate 1 are provided to stand on the shutter plate 1. In addition to the large-picture mask frame 1a, partially arcuated groove holes 7 having shapes corresponding to the pivotal ranges of the charge levers (not shown) are formed in the shutter plate 1. In addition to the large-picture mask frame 2a, partially arcuated groove holes 8a and 8b corresponding to the partially arcuated groove holes 7 are formed in the cover plate 2.

Font and rear blade groups 10 and 11, a partition plate 12, and spacers 14 and 15 are disposed between the plates 1 and 2. The front blade group 10 is constituted by a slit formation blade 10c and other split blades 10d supported on main and auxiliary arms 10a and 10b by caulking portions through links. An arm bearing is mounted in the pivotal center hole of the main arm 10a by caulking. The main arm 10a is swingably supported by the blade driving lever shaft 3b, and the auxiliary arm 10b is swingably supported by the auxiliary arm rotating shaft 5a. The rear blade group 11 is constituted by a slit formation blade 11c and other split blades 11d supported on main and auxiliary arms 11a and 11b by caulking portions through links. An arm bearing is mounted in the pivotal center hole of the main arm 11a by caulking. The main arm 11a is swingably supported by the blade driving lever shaft 3a, and the auxiliary arm 11b is swingably supported by the auxiliary arm rotating shaft 5b.

The partition plate 12 is placed between the front and rear blade groups 10 and 11 to prevent interference therebetween. An opening 12a corresponding to the mask frames 1a and 2a is formed in the partition plate 12. The spacers 14 and 15 are placed at positions to allow the distal end regions of the blades 10c, 10d, 11c, and 11d to slide in order to maintain smooth movement of the blade groups 10 and 11.

Figure 7:
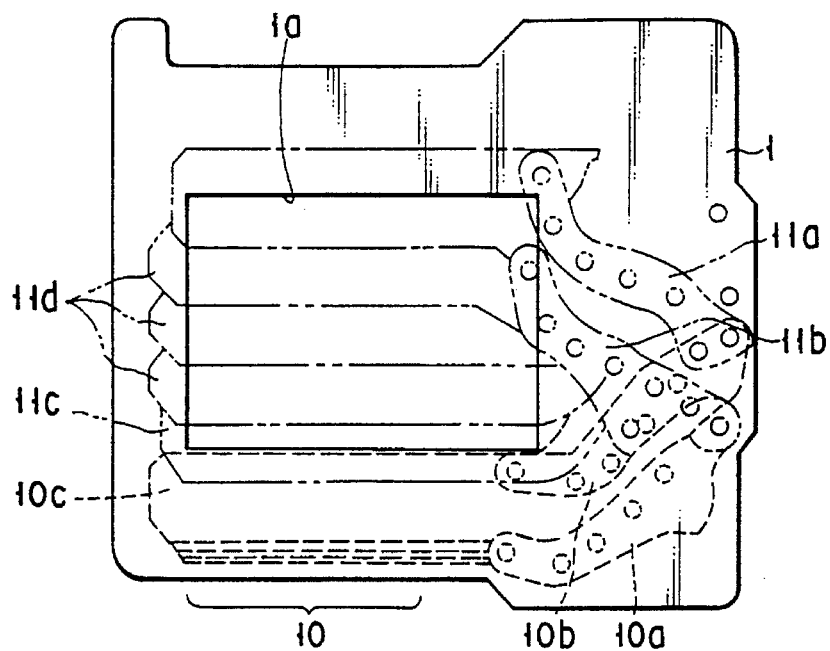
FIG. 7 is a front view showing the operation of a vertical-run focal-plane shutter mechanism.
Figure 8:
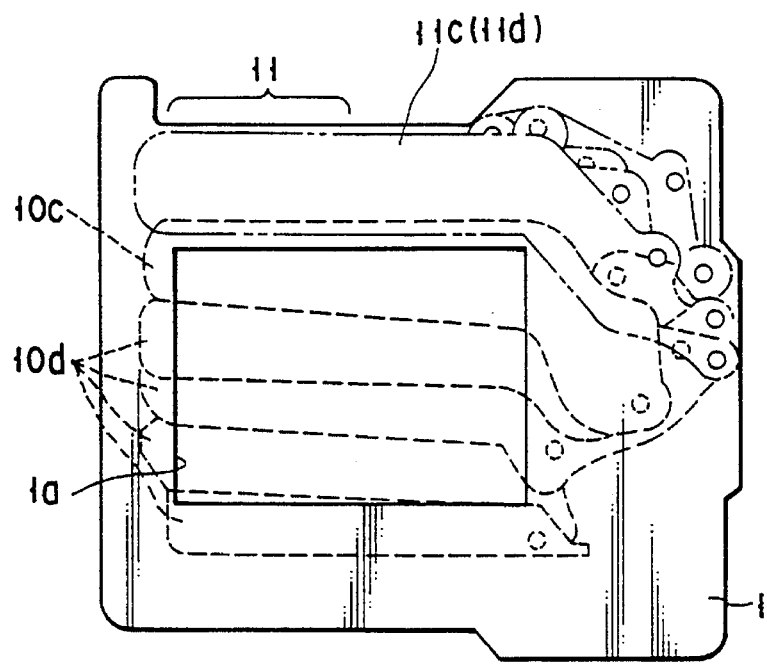
FIG. 8 is a front view showing the operation of the vertical-run focal-plane shutter mechanism.
Figure 9:
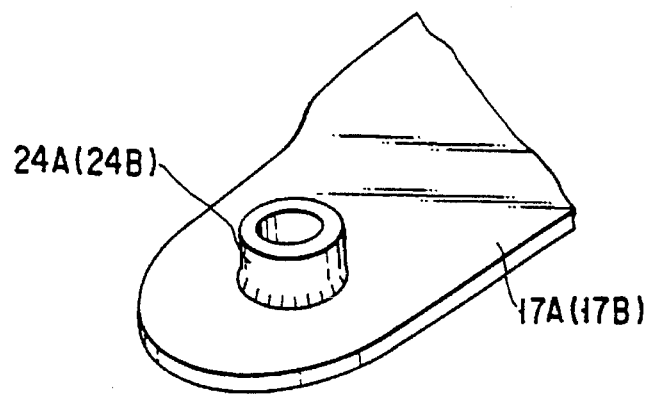
FIG. 9 is an enlarged perspective view showing the main part of an arrangement of a suspension shaft forming means fixed to a selector arm.

The shutter unit having the arrangement as described above operates as shown in FIGS. 7 and 8. More specifically, FIGS. 7 and 8 are views seen from the front side of the camera, in which FIG. 7 shows a state after the shutter is operated and the blades are moved to allow exposure, and FIG. 8 shows a state wherein the shutter is charged in connection with the film winding operation. When the shutter is charged, the blades 10c and 10d of the front blade group 10 are extended like a jalousie to close the aperture opening of the mask frame 1a. Then, the blades 11c and 11d of the rear blade group 11 overlap outside of the aperture opening of the mask frame 1a. Subsequently, when the shutter is released, the blades 10c and 10d are moved downward, and the blades 11c and 11d of the rear blade group 11 are extended like a jalousie to be moved downward. At this time, the film is exposed through a slit defined by the slit formation blades 10c and 11c moving downward through the aperture opening. When exposure is completed, as shown in FIG. 7, the blades 11c and 11d of the rear blade group 11 are extended like a jalousie to close the aperture opening of the mask frame 1a, and the blades 10c and 10d of the front blade group 10 overlap outside of the aperture opening of the mask frame 1a.

The present invention is constituted by skillfully incorporating the photographing picture size selecting mechanism including the picture size regulating members in the shutter unit that is constituted and operates in the manner as described above.

As shown in FIG. 1, the photographing picture size selecting mechanism is constituted by picture size regulating members 16A and 16B and a driving section. The picture size regulating members 16A and 16B are two very thin almost L-shaped frame plates and oppose each other to form a picture mask frame like a picture frame. The driving section moves the picture size regulating members 16A and 16B between first and second positions respectively inside and outside the aperture opening of the mask frames 1a and 2a. The driving section is mainly constituted by a pair of selector arms 17A and 17B for respectively moving the picture size regulating members 16A and 16B, a pair of driving gears 18A and 18B for respectively pivoting the selector arms 17A and 17B, and a selector actuating member 19 for rotating the gears 18A and 18B.

The picture size regulating members 16A and 16B are formed of thin plates having a thickness of, e.g., 0.2 mm or less, and are slidably attached on the outer surface of the cover plate 2, i.e., on the outer surface of the cover plate 2 that faces the film surface. A small projection piece 16Aa is formed at one end portion of the picture size regulating member 16A to extend outward substantially at a right angle, and an elongated driving hole 20a is formed in the small projection piece 16Aa. As shown in FIG. 2, elongated guide holes 20b and 20c each extending helically from the lower right portion to the upper left portion are formed in the right-angle portion and the other end portion, respectively, of the picture size regulating member 16A. Similarly, in the other picture size regulating member 16B, a small projection piece 16Ba is formed at its one end portion to extend outward substantially in an L-shape manner, and guide holes 21b and 21c are formed in its right-angle portion and its other end portion, respectively. An elongated driving hole 21a is formed in the distal end portion of the small projection piece 16Ba to be adjacent to the elongated driving hole 20a. The elongated guide holes 20c and 21c partially overlap each other so that a headed shaft 22a provided on the cover plate 2 extends through them. Similarly, headed shafts 22b and 22c provided on the cover plate 2 extend through the elongated guide holes 20b and 21b, respectively. Hence, the picture size regulating members 16A and 16B are moved along the diagonal in a direction to approach or to separate from each other.

Figure 4:
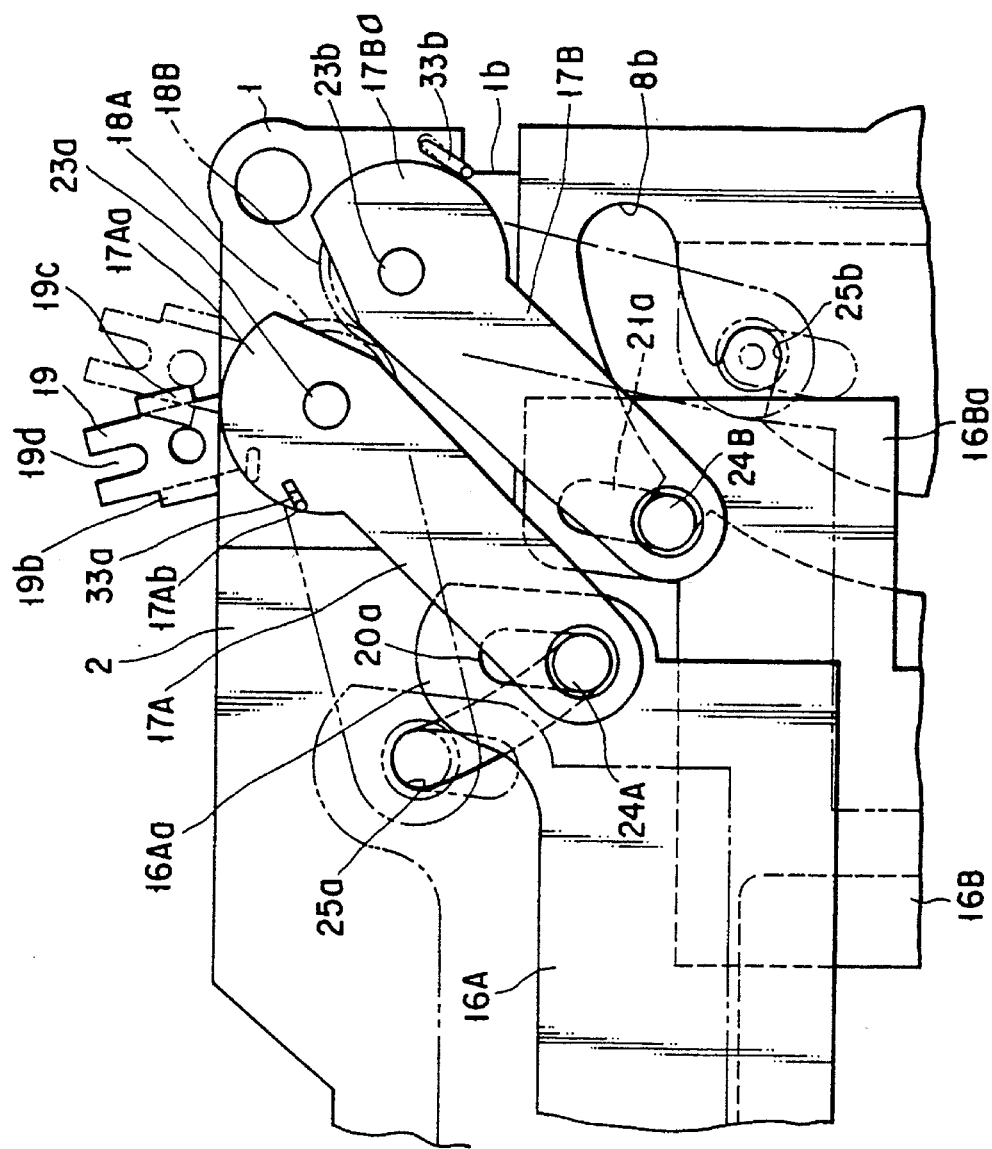
FIG. 4 is an enlarged front view showing a driving section of a photographing picture size selecting mechanism.

A corner portion of the cover plate 2 corresponding to the two small projection pieces 16Aa and 16Ba of the picture size regulating members 16A and 16B, that are disposed on the cover plate 2 in this manner, forms a notched portion 1b having a rectangular shape, and the driving section of the picture size regulating members 16A and 16B is disposed in this notched portion 1b. FIG. 4 is an enlarged plan view of this driving section, and FIG. 5 is a sectional view showing the main part of the driving section. More specifically, support shafts 23a and 23b provided on the shutter plate 1 extend through the notched portion 1b, and the driving gears 18A and 18B are rotatably and tightly fitted with the support shafts 23a and 23b, respectively, so that they are meshed with each other. An annular base portion 19a of the selector actuating member 19 is integrally attached to the lower surface of one driving gear 18A, and an annular base portion 17Aa of one selector arm 17A is integrally attached to the upper surface of the driving gear 18A. A vertical suspension shaft 24A is fixed to the distal end portion of the selector arm 17A. The vertical suspension shaft 24A extends through the elongated driving hole 20a in the picture size regulating member 16A and is fitted in a partially arcuated guide hole 25a formed in the cover plate 2. An annular base portion 17Ba of the other selector arm 17B is integrally attached to the upper surface of the other driving gear 18B, and a vertical suspension shaft 24B is fixed to the distal end portion of the selector arm 17B. The vertical suspension shaft 24B extends through the elongated driving hole 21a in the picture size regulating member 16B and is fitted in a partially arcuated guide hole 25b formed in the cover plate 2. The partially arcuated guide hole 25b intersects the partially arcuated groove hole 8b formed in the cover plate 2.

The selector actuating member 19 fixed to the lower surface of the driving gear 18A has two side edges formed with pivot regulating bent pieces 19b and 19c that are bent downward. When the bent piece 19b or 19c contacts the upper edge of the shutter plate 1, the pivotal movement of the selector actuating member 19 is regulated. A fork portion 19d is formed on the distal end portion of the selector actuating member 19, and as shown in FIG. 5, a selector shaft 27a of a picture size selector switch 27 disposed in an outer casing member 26 of the rear surface of the camera is fitted in the fork portion 19d. Upon a selector operation, the selector shaft 27a of the picture size selector switch 27 pivots the selector actuating member 19 about the support shaft 23a through the fork portion 19d.

Referring to FIG. 5, reference numeral 28 denotes a rear cover of the camera; 29, a pressure plate for pressing the film; 30, a film rail; and 31, an aperture serving as a picture mask integrally formed with the camera body. The picture mask 31 has the same size and shape as those of each of the large-picture mask frames 1a and 2a respectively formed in the shutter plate 1 and the cover plate 2.

When the picture size regulating members 16A and 16B are moved to the first position inside the aperture openings of the mask frames 1a and 2a and when they are moved to the second position outside the aperture openings of the mask frames 1a and 2a, the picture size regulating members 16A and 16B must be stably held at the corresponding positions. For this purpose, a toggle spring 33 for holding the selector position is provided in the driving section in the following manner. That is, as shown in FIG. 6, the toggle spring 33 is made of an elastic wire member having an upwardly slightly extended S shape. One end portion 33a of the toggle spring 33 is locked by a recessed portion 17Ab formed in the annular base portion 17Aa of the selector arm 17A, the other end portion 33b thereof is locked by the notched portion 1b formed in one edge portion of the shutter plate 1, and an intermediate arcuated portion thereof surrounds the support shafts 23a and 23b.

When the toggle spring 33 arranged in this manner is in the state indicated by a broken line in FIG. 6, i.e., when the toggle spring 33 pivots the selector arms 17A and 17B counterclockwise and clockwise, respectively, to move the picture size regulating members 16A and 16B to the first position inside the aperture openings, a tensile force acts between A0 and C0. As a result, as shown in FIG. 6, a counterclockwise pivoting force about the support shaft 23a is applied to the selector arm 17A to bias the selector arm 17A to the counterclockwise pivotal position, and thus the picture size regulating members 16A and 16B are stably held at the first position in the aperture openings of the mask frames 1a and 2a. In contrast to this, when the toggle spring 33 pivots the selector arms 17A and 17B clockwise and counterclockwise, respectively, to move the picture size regulating members 16A and 16B to the second position outside the aperture openings, a tensile force acts between B0 and C0. As a result, as shown in FIG. 6, a clockwise pivoting force about the support shaft 23a is applied to the selector arm 17A to bias the selector arm 17A to the clockwise pivotal position, and thus the picture size regulating members 16A and 16B are stably held at the second position outside the aperture openings of the mask frames 1a and 2a.

The operation of the shutter unit according to the present invention having the arrangement as described above will be described. When the photographer wishes to photograph an object in the large picture size, he or she switches the picture size selector switch 27 (FIG. 5) exposed to the rear surface of the camera to the large picture size side. Then, the selector shaft 27a of the picture size selector switch 27 pivots the selector actuating member 19 clockwise about the support shaft 23a through the fork portion 19d, and hence the driving gear 18A and the selector arm 17A are integrally pivoted clockwise about the support shaft 23a. When the selector arm 17A is pivoted clockwise, because of the function of its vertical suspension shaft 24A, the elongated guide holes 20b and 20c of the picture size regulating member 16A are guided by the headed shafts 22c and 22a so that the picture size regulating member 16A is moved in the outer direction of the diagonals of the mask frames 1a and 2a, i.e., toward the second position outside the aperture openings of the mask frames 1a and 2a. When the vertical suspension shaft 24A reaches the uppermost position in the partially arcuated guide hole 25a, it moves the picture size regulating member 16A to the second position outside the aperture openings of the mask frames 1a and 2a. Simultaneously, since the driving gear 18B meshing with the driving gear 18A is also pivoted about the support shaft 23b, the selector arm 17B is also integrally pivoted counterclockwise about the support shaft 23b. When the selector arm 17B is pivoted counterclockwise, because of the operation of its vertical suspension shaft 24B, the elongated guide holes 21b and 21c of the picture size regulating member 16B are guided by the headed shafts 22b and 22a so that the picture size regulating member 16B is moved toward the second position outside the aperture openings of the mask frames 1a and 2a along the diagonals of the mask frames 1a and 2a. When the vertical suspension shaft 24B reaches the lowermost position in the partially arcuated guide hole 25b, it moves the picture size regulating member 16B to the second position outside the aperture openings of the mask frames 1a and 2a (FIG. 3).

While the selector arm 17A is pivoted, the elastic force of the toggle spring 33 acts to aid the pivot movement of the selector arm 17A until the bent piece 19c of the selector actuating member 19 contacts the upper edge of the shutter plate 1.

With the above operation, the photographing picture size is set to the large picture size defined by the aperture openings of the mask frames 1a and 2a and the aperture 31. After the picture size regulating members 16A and 16B are moved to the second position outside the aperture openings to switch the picture size in this manner, the positions of the picture size regulating members 16A and 16B are stably held by the biasing force of the toggle spring 33. Thus, the picture size will not be changed by the vibration and the like.

Figure 3:
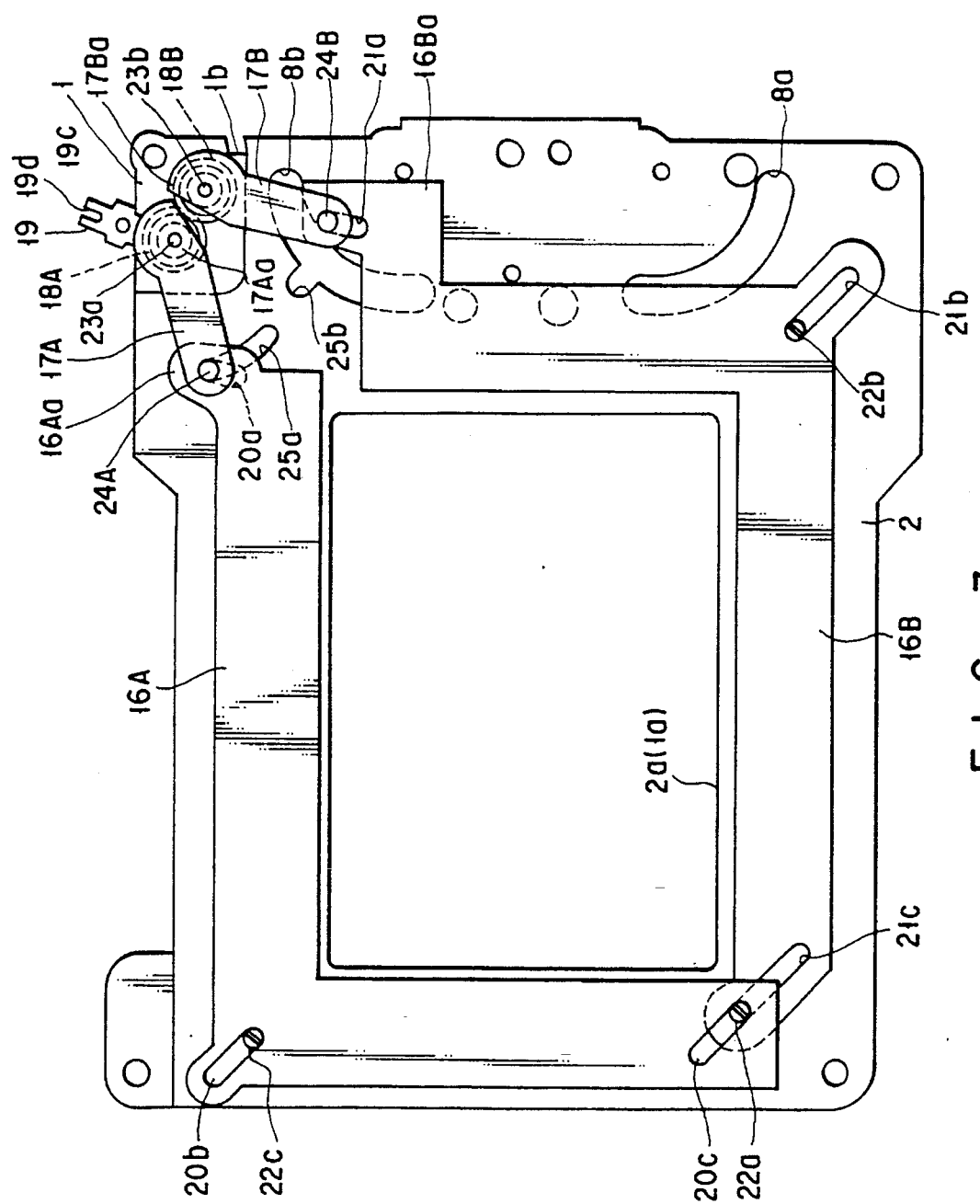
FIG. 3 is an enlarged front view showing a state wherein a large photographing picture size is set in the shutter unit shown in FIG. 1.

When the photographer wishes to switch the picture size from the state shown in FIG. 3 to the ordinary size (24 mm×36 mm) as shown in FIG. 2, he or she switches the picture size selector switch 27 (FIG. 5) in the opposite direction to the above-mentioned case. Then, the selector shaft 27a of the picture size selector switch 27 pivots the selector actuating member 19 counterclockwise about the support shaft 23a through the fork portion 19d, and hence the driving gear 18A and the selector arm 17A are integrally pivoted counterclockwise about the support shaft 23a. When the selector arm 17A is pivoted counterclockwise, because of the function of its vertical suspension shaft 24A, the elongated guide holes 20b and 20c of the picture size regulating member 16A are guided by the headed shafts 22c and 22a so that the picture size regulating member 16A is moved in the inner direction of the diagonals of the mask frames 1a and 2a toward the first position inside the aperture openings of the mask frames 1a and 2a. When the vertical suspension shaft 24A reaches the lowermost position in the partially arcuated guide hole 25a, it moves the picture size regulating member 16A to the first position inside the aperture openings of the mask frames 1a and 2a. Simultaneously, since the driving gear 18B meshing with the driving gear 18A is also pivoted clockwise about the support shaft 23b, the selector arm 17B is also integrally pivoted clockwise about the support shaft 23b. When the selector arm 17B is pivoted clockwise, because of the operation of its vertical suspension shaft 24B, the elongated guide holes 21b and 21c of the picture size regulating member 16B are guided by the headed shafts 22b and 22a so that the picture size regulating member 16B is moved toward the first position in the aperture openings of the mask frames 1a and 2a in the inner direction of the diagonals of the mask frames 1a and 2a. When the vertical suspension shaft 24B reaches the uppermost position in the partially arcuated guide hole 25b, it moves the picture size regulating member 16B to the first position in the aperture openings of the mask frames 1a and 2a (FIG. 2).

While the selector arm 17A is pivoted, the elastic force of the toggle spring 33 acts to aid the pivot movement of the selector arm 17A until the bent piece 19b of the selector actuating member 19 contacts the upper edge of the shutter plate 1.

With the above operation, the photographing picture size is set to the ordinary picture size (24 mm×36 mm) defined by picture size regulating members 16A and 16B, as shown in FIG. 2. After the picture size regulating members 16A and 16B are moved to the first position in the aperture openings to switch the picture size in this manner, the positions of the picture size regulating members 16A and 16B are stably held by the biasing force of the toggle spring 33. Thus, the picture size will not be changed by the vibration and the like.

In this embodiment, the bent pieces 19b and 19c are provided to the selector actuating member 19 which is interlocked to the picture size selector switch 27. When the picture size regulating members 16A and 16B are moved to the first or second position, the bent pieces 19b and 19c contact the shutter plate 1 to regulate the positions of the picture size regulating members 16A and 16B. The bent portions of the bent pieces 19b and 19c are adjusted so that the picture size regulating members 16A and 16B are precisely switched to the predetermined picture size.

This arrangement provides the following advantages. That is, the conventional photographing picture size (24 mm×36 mm) is determined to have an allowance of 0 to +0.8 by JIS standards. In the actual manufacture, however, more strict size precision is required. In order to obtain a compact photographing picture size selecting mechanism, it is optimum to use an enlarging mechanism employing a lever. However, since the enlarging mechanism undesirably enlarges an error in parts precision, when the picture size is to be determined at high precision, the parts precision must be high. In this respect, with the adjusting portions as described above, the manufacture is facilitated.

Each of the selector arms 17A and 17B is constituted by a thin plate having a thickness of, e.g., 0.1 to 0.2 mm.

Accordingly, in order to provide the vertical suspension shafts 24A and 24B, which are to be fitted in the elongated driving holes 20a and 21b formed in the picture size regulating members 16A and 16B, on the distal end portions of the selector arms 17A and 17B by caulking, an advanced technique is needed. If, however, the vertical suspension shafts 24A and 24B are integrally formed with the selector arms 17A and 17B by drawing press molding during the manufacture of the selector arms 17A and 17B, the structure of the selector arms 17A and 17B is simplified at a low cost, and the thickness of the flange needed for caulking can be eliminated, resulting in a space-saving design.

Furthermore, the picture size regulating members 16A and 16A are manufactured by coating a black lubricant on materials, e.g., metal plates or plastic sheets each having a thickness of, e.g., 0.05 to 0.1 mm. In this manner, since the picture size regulating members 16A and 16B and the selector arms 17A and 17B are formed of very thin plate-like components, the shutter unit can be manufactured without substantially changing the thickness of the shutter unit when compared to that of a conventional one, and thus switching of the picture size can be performed without changing the size of the camera. In this embodiment, since the selector actuating member 19 for switching the picture size, the driving gears 18A and 18B, the toggle spring 33, and the like are disposed between the shutter plate 1 and the cover plate 2, a shutter unit capable of switching the picture size can be manufactured without substantially changing the size of the entire shutter unit.

Figure 10:
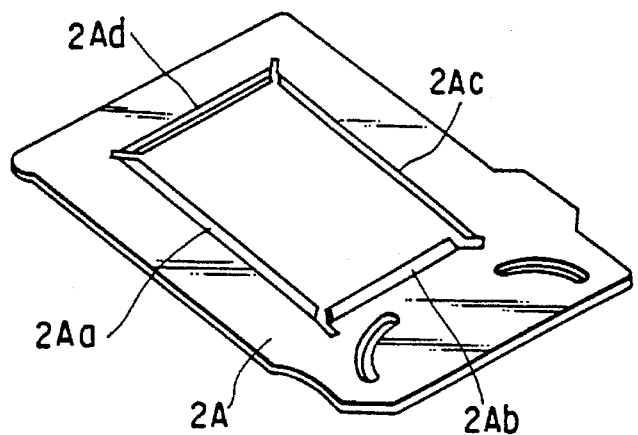
FIG. 10 is a perspective view showing a conventional cover plate.
Figure 11:
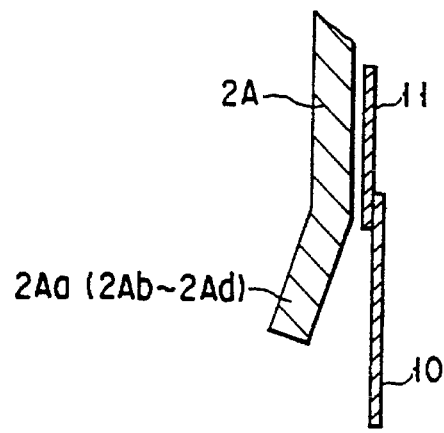
FIG. 11 is an enlarged sectional view showing the main part of a peripheral bent portion of the cover plate shown in FIG. 10.
Figure 14:
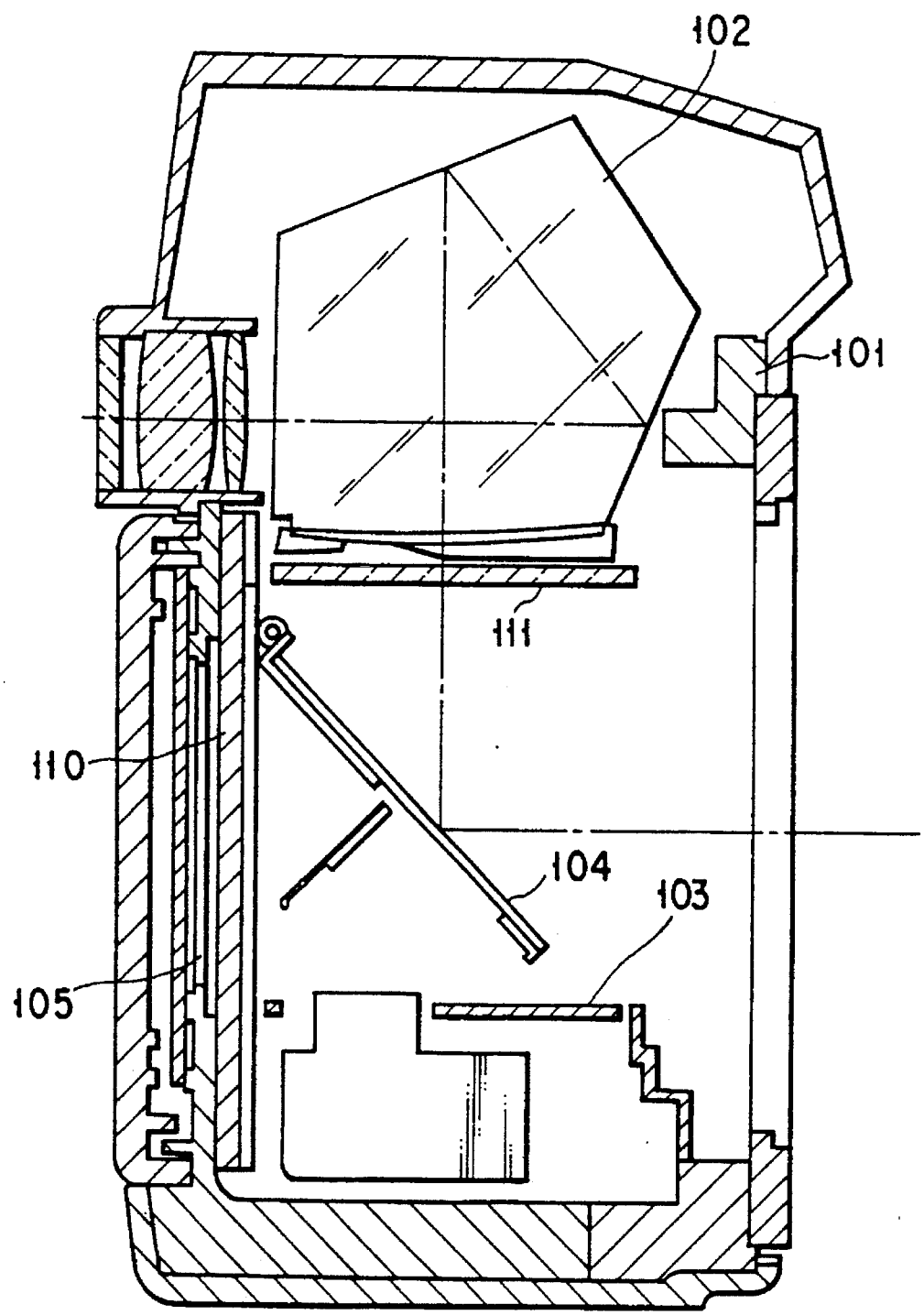
FIG. 14 is a sectional view showing the main part of the schematic arrangement of the camera body of the single-lens reflex camera.

In a known shutter unit, around the aperture in a cover plate 2A located on the film surface side of the shutter unit, peripheral portions 2Aa to 2Ad of the cover plate 2A are bent to the film surface side, as shown in FIGS. 10 and 11, in order to prevent shutter blades 10 and 11 from being caught by the end face of the aperture during running to be damaged.

In the cover plate 2 of the embodiment of the present invention, its peripheral portions 2Aa to 2Ad are not bent to decrease its thickness, unlike in the conventional shutter unit, but an opening edge portion 2A0 of the aperture is press-molded instead such that its thickness is gradually decreased toward the opening. With this arrangement, the peripheral bent portions 2Aa to 2Ad which serve as obstacles in operation of the picture size regulating members 16A and 16B can be eliminated, the picture size regulating members 16A and 16B can be smoothly operated, the shutter blades 10 and 11 can be prevented from being caught by the aperture end face during running, and the thickness of the cover plate 2 can be decreased.

Furthermore, in this embodiment, the picture size is switched by manually operating the picture size selector switch. However, the picture size can be switched by using an electric selecting mechanism in which an actuator is operated to drive a selector switch when a photographer depresses the selector switch to input an electrical signal, or by a shutter unit in which automatic selection is performed by detecting the type of film, as has been previously proposed (Japanese Patent Application No. 3-200877, corresponding to U.S. patent application Ser. No. 07/926,500 filed Aug. 5, 1992) by the assignee of the present application.

A shutter unit according to a second embodiment of the present invention will now be described.

The shutter unit of the second embodiment performs a picture size selecting operation in association with an operation of a picture size selector (not shown) provided outside a camera. In the first embodiment, an ordinary photographing picture size (24 mm×36 mm) and a photographing picture size larger than that are switched with each other. In the second embodiment, an ordinary photographing picture size and a photographing picture size smaller than that can be switched with each other.

Figure 15:
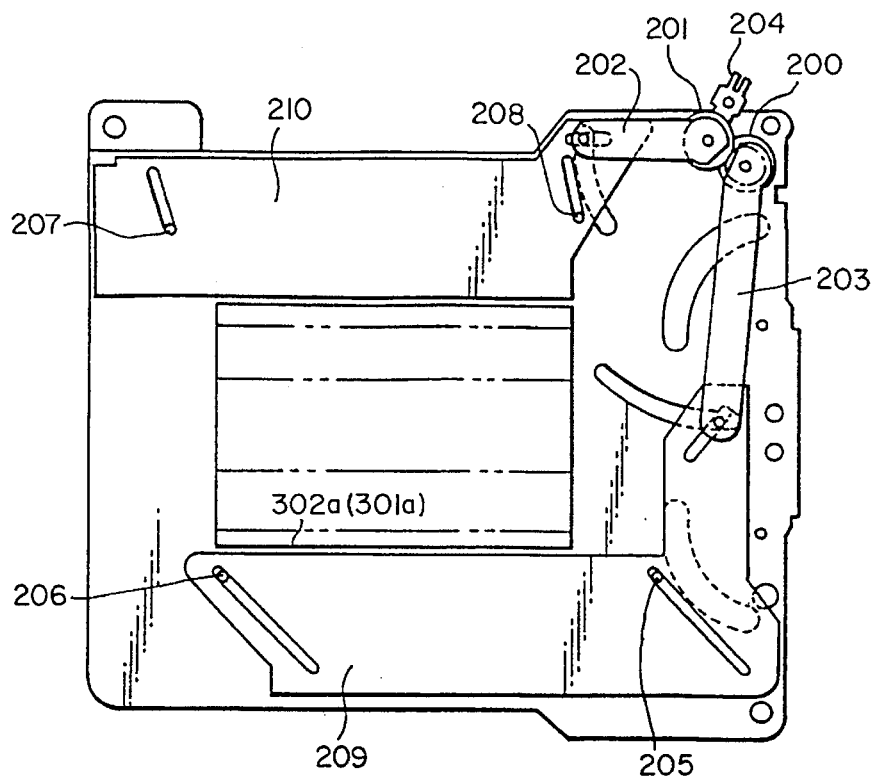
FIG. 15 is an enlarged front view showing a state where an ordinary photographing picture size is set in a shutter unit according to a second embodiment of the present invention.

FIG. 15 is an enlarged front view showing a state where an ordinary photographing picture size is set in the shutter unit according to the second embodiment. Since the shutter unit of the second embodiment has substantially the same structure as that of the shutter unit of the first embodiment, only the differences between them will now be described. The shutter unit of the second embodiment comprises gears 200A and 201B having different gear ratios to obtain a predetermined rotating angle corresponding to the operation of the picture size selector, and mask frames (apertures) 201a and 202a for the ordinary picture size, each mask frame having the same function as, but a different size from that of each mask frame of the first embodiment. Picture size regulating members 210A and 209B move inside or outside the mask frames (apertures) 301a and 302a in association with the operation of the picture size selector to switch between the ordinary photographing picture size and a photographing picture size smaller than said ordinary picture size.

Figure 16:
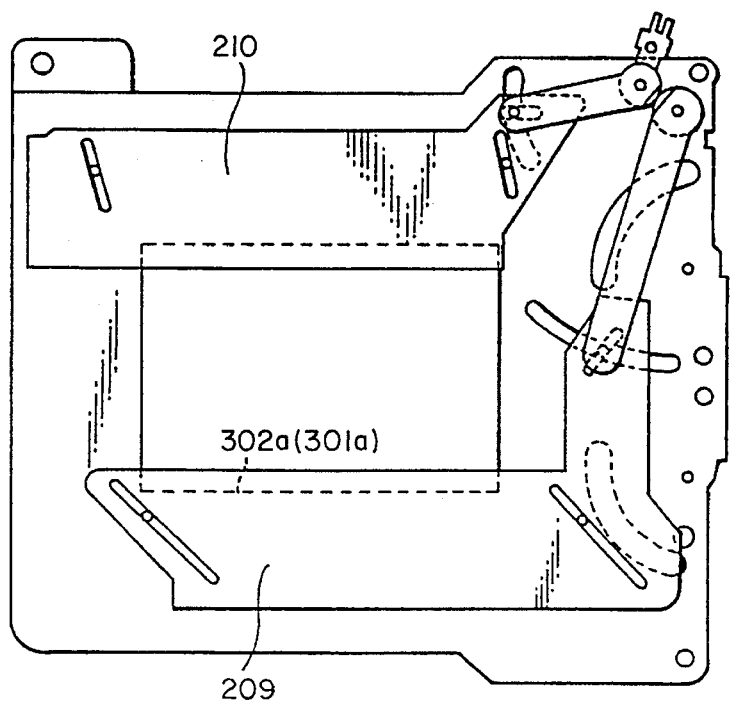
FIG. 16 is an enlarged front view showing a state where a small photographing picture size is set in the shutter unit shown in FIG. 15.

FIG. 16 is an enlarged front view showing a state where the picture size is set to 20.25 mm×36 mm; that is, the ratio of length to width of a picture is set to 9 to 16 by the picture size regulating members 210A and 209B in the shutter unit of the second embodiment, and FIG. 17 is an enlarged front view showing a state where the picture size is set to (13 mm×36 mm) which is a so-called panorama size.

In the shutter unit shown in FIG. 15, a driving gear 201 is coupled to a selector arm 202 and meshes with another driving gear 200, and a selector actuating member 204 causes the driving gear 201 to pivot counterclockwise and simultaneously causes the driving gear 200 to pivot clockwise when the selector actuating member 204 is pivoted counterclockwise by the picture size selector. The number of teeth of the driving gear 200 is so determined as to obtain a predetermined rotating angle when the driving gear 200 pivots.

An S-shaped toggle spring (not shown) for biasing the other driving mechanism and the selector arm 202 to first and second positions is the same as that of the first embodiment.

FIG. 15 shows positions of the picture size regulating members and the selector arms in photographing at a full size of 24 mm×36 mm.

FIG. 16 shows a state where the selector actuating member 204 is pivoted counterclockwise, and the driving gears 200 and 201 and the selector arms 202 and 203 are pivoted so that the picture size is set to 20.25 mm× 36 mm; that is, the ratio of length to width of a picture is 9 to 16. Like in the first embodiment, the S-shaped toggle spring expands in a direction in which its biasing force is increased and generates such a rotating force as to stabilize the pivoting position of the selector actuating member 204. Since a picture size determining position is located in the vicinity of the maximum deformation position where the toggle spring expands the longest, there is no fear that the selector actuating member 204 will be pivoted. If a creek groove is formed in the selector actuating member 204 or a well-known creek mechanism is constituted by a plate spring or the like, the pivoting of the selector actuating member can be prevented with higher reliability.

FIG. 17 shows positions of the picture size regulating members when the picture size is switched to a size of 13 mm×36 mm, which is a so-called panorama size, by pivoting the selector actuating member 204 counterclockwise. As the selector actuating member 204 pivots counterclockwise, the selector arm 202 pivots counterclockwise and the selector arm 203 pivots clockwise. Then, the picture size regulating members are moved by virtue of guide pins 205 to 208 of a cover plate, with the result that the panorama picture size can be selected.

A shutter unit according to a third embodiment of the present invention will now be described. The shutter unit of the third embodiment performs a picture size selecting operation in association with an operation of a picture size selector (not shown) provided outside a camera, as the shutter unit of the second embodiment does. Furthermore, the shutter unit of the third embodiment switches between an ordinary photographing picture size (24 mm×36 mm) and a larger photographing picture size (29 mm×41 mm), as the shutter unit of the first embodiment does.

FIG. 18 is an enlarged front view showing a state where a large photographing picture size is set in the shutter unit according to the third embodiment, FIG. 19 is an enlarged front view showing a state where an ordinary photographing picture size is set in the shutter unit, and FIG. 20 is an enlarged front view showing a state where the length of an ordinary photographing picture is reduced; that is, a large width picture size is set in the shutter unit.

The shutter unit of the third embodiment has the same structure as those of the shutter units of the first and second embodiments. More specifically, the shutter unit of the third embodiment comprises gears 201A and 209B having different gear ratios to obtain a predetermined rotating angle corresponding to the operation of the picture size selector as in the second embodiment, and it also comprises mask frames (apertures) 301a and 302a for a large picture size as in the first embodiment. Further, the shutter unit comprises picture size regulating members 210A and 209B which move inside or outside the mask frames (apertures) 301a and 302a to switch between the respective photographing picture sizes.

As shown in FIGS. 18 to 20, the mechanism of the shutter unit including a selector actuating lever 204, driving gears 200 and 201, selector arms 202 and 203, and an S-shaped toggle spring (not shown), for selecting a picture size by operating the selector actuating lever 204, is the same as that of the shutter unit according to the third embodiment. In the third embodiment, three different picture sizes can be switched relative to each other.

FIG. 18 shows a state where the picture size is set to 29 mm×41 mm in the shutter unit, FIG. 19 shows a state where the picture size is set to 24 mm×36 mm in the shutter unit, and FIG. 20 shows a state where the width of a picture is set to 36 mm and the length thereof is reduced further to set the ratio of the length to width to, for example, 9 to 16 or to select a so-called panorama picture size.

Similarly, in the third embodiment, guide pins 205 to 208 are arranged in part of a cover plate 300 so that they are fit into guide grooves 209a, 209b, 210a and 210b formed in picture size regulating members 209 and 210 to regulate the moving direction thereof. Further, cam grooves 209c and 210c are formed in respective ends of the selector arms 202 and 203, and guide shafts 202a and 203a, which are projected toward the cover plate, are fit into the cam grooves.

In the shutter unit shown in FIG. 18, when the selector actuating lever 204 pivots counterclockwise, the driving gears 200 and 201 pivot by their respective rotating angles in accordance with the rotating angle of the selector actuating lever 204 and the gear ratio of the driving gear 200 to the driving gear 201. Then, the guide shafts 202a and 203a move along the cam grooves 209c and 210c while being pressed against end surfaces of the cam grooves 209c and 210c, and the picture size regulating members move along the guide grooves 209a, 209b, 210a and 210b by virtue of the guide pins 205, 206, 207 and 208.

With the above structure of the shutter unit according to a third embodiment, the picture size can be switched in association with an operation of the picture size selector provided outside a camera.

As has been described above, according to the present invention, the photographing picture size selecting mechanism is incorporated by skillfully utilizing the shutter unit. Therefore, remarkable effects can be obtained as follows:

1) Since the gap between the structure in the camera body and the shutter unit can be effectively used, the selecting mechanism can be designed without substantially changing its appearance.

2) Since the selecting mechanism can be integrally incorporated in the shutter unit, its assembly is very easy.

3) The precision of the picture size can be easily adjusted after the unit is assembled.

4) Since the photographing picture size selecting mechanism is arranged outside the operating areas of the shutter blades and the driving arms of the shutter unit and at a position not largely influencing the outer size of the shutter unit, the size of the shutter unit need not be increased.

What is claimed is:

1. A camera capable of selecting a picture size, comprising:

a focal plane shutter unit interposed between a photographing lens and a film surface, said focal plane shutter unit including a base plate having an opening therein, and a shutter blade driving section located at a side portion of the opening of said base plate;

a pair of L-shaped picture size regulating members formed along the opening of said base plate of said focal plane shutter unit; and driving means for moving said pair of L-shaped picture size regulating members to a first position inside the opening of said base plate and to a second position outside the opening of said base plate;

said driving means including a pair of selector arms coupled to said pair of L-shaped picture size regulating members, a pair of driving gears for pivotally moving said pair of selector arms, and a selector actuating member for rotating said pair of driving gears from outside a body of the camera; and said driving means being located above the shutter blade driving section and on a portion of said base plate away from said side portion of the opening of said base plate so as not to interfere with operation of said focal plane shutter unit.

2. The camera according to claim 1, wherein said pair of L-shaped picture size regulating members includes:

guide holes for regulating moving positions of said picture size regulating members; and guide pins formed in said base plate and which are engaged with the guide holes.

3. The camera according to claim 1, wherein said driving gears are engaged with each other and are pivoted in directions opposite to each other.

4. The camera according to claim 1, further comprising a toggle spring interposed between said pair of selector arms, said toggle spring biasing said pair of selector arms to be opened when said pair of L-shaped picture size regulating members is located at the first position and to be closed when said pair of L-shaped picture size regulating members is located at the second position.

5. The camera according to claim 1, wherein said pair of selector arms includes shafts formed by press molding, and wherein said shafts are fit into grooves formed in a surface of said focal plane shutter unit.

6. The camera according to claim 1, wherein said driving means is located above one side of said focal plane shutter unit.

7. The camera according to claim 1, wherein said driving means further comprises a coupler member for coupling said selector actuating member and said pair of driving gears.

* * * * *